(12) United States Patent
Arai

(10) Patent No.: US 12,299,524 B2
(45) Date of Patent: *May 13, 2025

(54) PRINTER, PRINTER CONTROL METHOD OF PRINTER AND NON-TRANSITORY COMPUTER-READABLE MEDIUM

(71) Applicant: SATO HOLDINGS KABUSHIKI KAISHA, Tokyo (JP)

(72) Inventor: Hidekazu Arai, Saitama (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/437,545

(22) Filed: Feb. 9, 2024

(65) Prior Publication Data

US 2024/0176967 A1 May 30, 2024

Related U.S. Application Data

(63) Continuation of application No. 17/425,843, filed as application No. PCT/JP2020/003996 on Feb. 3, 2020, now Pat. No. 11,907,797.

(30) Foreign Application Priority Data

Mar. 29, 2019 (JP) ................................ 2019-066732

(51) Int. Cl.
*G06K 7/10* (2006.01)
*G06K 15/02* (2006.01)

(52) U.S. Cl.
CPC ....... *G06K 7/10366* (2013.01); *G06K 15/022* (2013.01); *G06K 15/024* (2013.01)

(58) Field of Classification Search
CPC ............ G06K 7/10366; G06K 15/022; G06K 15/024; G06K 17/0025; B41J 11/46; B41J 2/325; B41J 3/01; B41J 3/4075; B41J 3/46; B41J 3/50; B41J 29/38
See application file for complete search history.

(56) References Cited

U.S. PATENT DOCUMENTS

| | | | |
|---|---|---|---|
| 2002/0167397 A1* | 11/2002 | Eroglu | G06K 7/0008 340/10.6 |
| 2005/0058483 A1 | 3/2005 | Chapman et al. | |
| 2006/0250245 A1* | 11/2006 | Forster | G06K 7/10316 340/572.1 |
| 2008/0074267 A1 | 3/2008 | Sugiyama | |
| 2010/0141394 A1 | 6/2010 | Sugiyama | |
| 2013/0015959 A1 | 1/2013 | Sano | |
| 2013/0293356 A1 | 11/2013 | Mukai et al. | |

(Continued)

FOREIGN PATENT DOCUMENTS

| CN | 101149809 A | 3/2008 |
|---|---|---|
| CN | 108229604 A | 6/2018 |

(Continued)

*Primary Examiner* — Jamara A Franklin
(74) *Attorney, Agent, or Firm* — Foley & Lardner LLP

(57) ABSTRACT

A printer includes: a controller configured to: acquire a plurality of radio wave strengths of a plurality of RFID signals, each RFID signal being from an RFID included in each of a plurality of printing media, set a threshold based on the acquired plurality of the radio wave strengths, and determine whether or not each RFID is normal based its respective radio wave strength and the set threshold.

10 Claims, 8 Drawing Sheets

(56) References Cited

U.S. PATENT DOCUMENTS

| | | | |
|---|---|---|---|
| 2018/0165487 A1 | 6/2018 | Hori | |
| 2019/0229818 A1 | 7/2019 | Uchimura et al. | |

FOREIGN PATENT DOCUMENTS

| | | | |
|---|---|---|---|
| JP | 2001-096814 A | 4/2001 |
| JP | 2006-099502 A | 4/2006 |
| JP | 2008-077500 A | 4/2008 |
| JP | 2009-086923 A | 4/2009 |
| JP | 2010-134675 A | 6/2010 |
| JP | 2013-020501 A | 1/2013 |
| JP | 5304975 B1 | 10/2013 |
| JP | 2018-052690 A | 4/2018 |
| JP | 2018-097686 A | 6/2018 |

\* cited by examiner

PRINTER, PRINTER CONTROL METHOD OF PRINTER AND NON-TRANSITORY COMPUTER-READABLE MEDIUM

CROSS REFERENCE TO RELATED APPLICATIONS

The present application is a continuation of U.S. patent application Ser. No. 17/425,843, filed on Jul. 26, 2021, which is a national stage application of PCT Application No. PCT/JP2020/003996, filed on Feb. 3, 2020, which claims priority to Japanese Application No. 2019-066732, filed on Mar. 29, 2019.

TECHNICAL FIELD

The present invention relates to a printer, a printer control method of printer and program.

BACKGROUND ART

RFID (Radio Frequency Identification) technology transmits and receives, via contactless communication, information on an IC chip on which identification information is written, and is applied in various fields. JP2009-086923A discloses a printer that transmits and receives signals without contact to a tag label embedded with a radio tag circuit element of an RFID specification, as well as performing printing.

Conventionally, radio tag circuit elements of an RFID specification (RFID inlets) vary in communication conditions depending on matters such as individual differences, fixed state to the label or the like, and printer structure; hence, there were such cases where for example although the RFID inlet was successfully written onto, errors occurred when reading out later. Therefore, there was the need to carefully inspect the RFID before using the RFID.

SUMMARY OF INVENTION

In view of such technical problem, an object of the present invention is to efficiently perform close inspection of the RFID.

According to one aspect of the present invention, a printer is provided, which printer prints each printing medium having an RFID, the printer including: a radio wave strength obtaining unit configured to obtain radio wave strength from an RFID; and a determine unit configured to determine whether the RFID is normal or not on the basis of radio wave strength obtained by the radio wave strength obtaining unit and a threshold.

According to one aspect of the present invention, it is possible to perform close inspection of the RFID efficiently.

DESCRIPTION OF EMBODIMENTS

Figure 1:
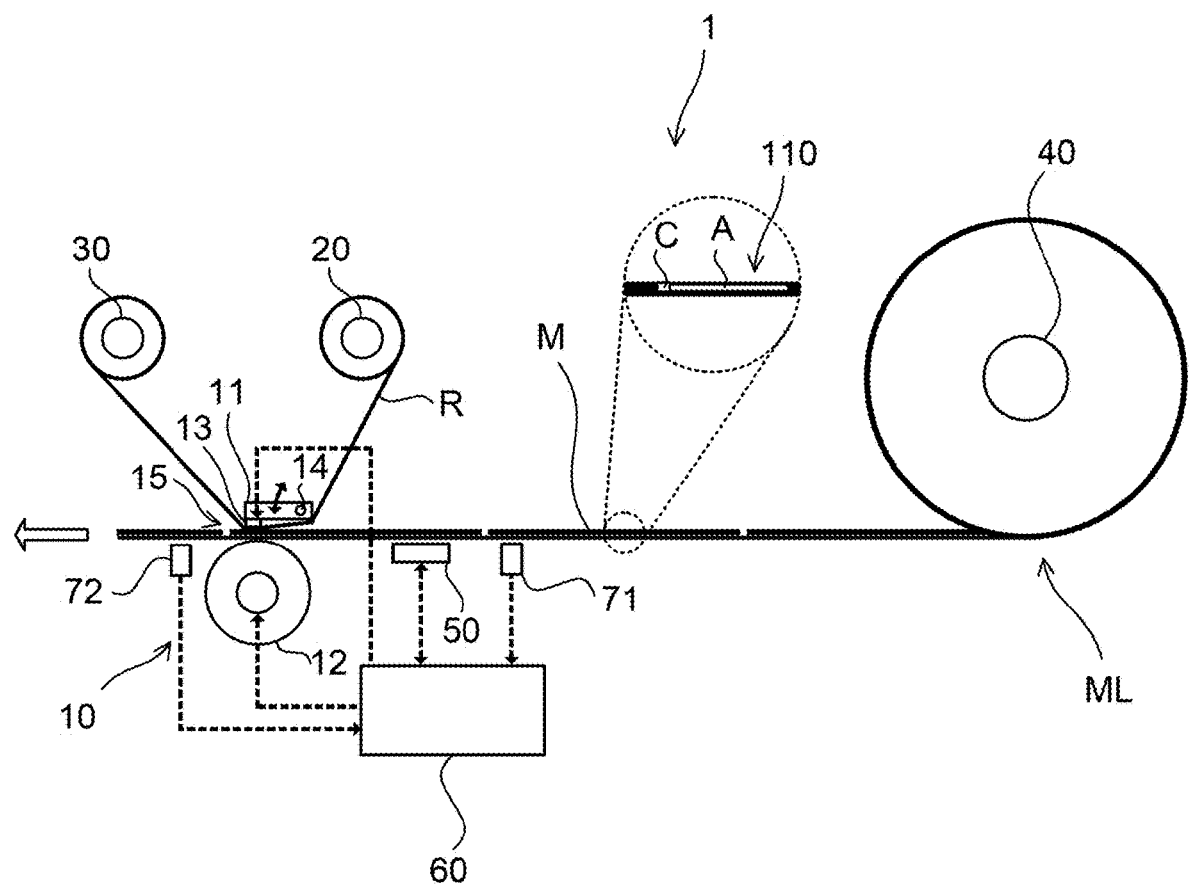
FIG. 1 is a schematic configuration diagram of a printer according to an embodiment of the present invention.

The following describes of a printer 1 according to embodiments of the present invention in detail, with reference to the attached drawings. FIG. 1 is a schematic configuration diagram of a printer 1 according to an embodiment of the present invention.

The printer 1 is of a thermal transfer type that prints by heating an ink ribbon R and transferring the ink of the ink ribbon R onto each print medium M. The print medium M is configured, for example, as a continuous body ML on which a plurality of labels are continuously attached temporarily at predetermined intervals on a band-form backing paper and which is wound as a roll shape.

The print medium M is configured as an RFID (Radio Frequency Identification) medium embedded with an RFID inlet 110 having an IC chip C of the RFID specification and an antenna A. The printer 1 may also print on a printing medium having no IC chip C or antenna A.

The printer 1 prints variable information such as prices, barcodes, other product information, and management information related to objects or services as necessary on a printing region of the print medium M, and also writes in information corresponding to the variable information to each RFID inlet 110 as electronic data.

The present embodiment describes, as one example of the print medium M, a label that has an adhesive on its back surface and that can be adhered on a subject by that adhesive, however it is not limited to this; the print medium M may be one that is to be fixed on the subject using a fixing component, such as a tag or a wrist band.

The printer 1, as illustrated in FIG. 1, includes, for example, a printing mechanism 10, a ribbon supply shaft 20, a ribbon roll up shaft 30, a medium supply shaft 40, a communication unit 50, an upstream side position detection sensor 71, a downstream side position detection sensor 72, and a controller 60 as a control unit.

The printing mechanism 10 includes a head unit 11 and a platen roller 12, and prints onto the print medium M and feeds the continuous body ML and the ink ribbon R.

The head unit 11 holds a thermal head 13 with a heating element in the thermal head 13 is exposed from a lower surface. The platen roller 12 is disposed immediately below the thermal head 13 and constitutes a printing unit 15 that performs printing on the print medium M with the thermal head 13.

The head unit 11 is swingably supported in an arrow direction in FIG. 1 by a supporting shaft 14. The head unit 11 can be move to a head open position where the thermal head 13 is separated away from the platen roller 12, and a head closed position where the thermal head 13 abuts on the platen roller 12. In FIG. 1, the head unit 11 is at the head closed position.

The ribbon supply shaft 20 holds the ink ribbon R to be supplied to the printing unit 15 in a roll shape. The ink ribbon R supplied from the ribbon supply shaft 20 to the printing unit 15 is nipped between the thermal head 13 and the platen roller 12.

The medium supply shaft 40 holds the continuous body ML to be fed to the printing unit 15 in a roll shape. The continuous body ML fed from the medium supply shaft 40 to the printing unit 15 is nipped together with the ink ribbon R between the thermal head 13 and the platen roller 12.

When the heating element in the thermal head 13 is energized with the print medium M and the ink ribbon R are nipped between the thermal head 13 and the platen roller 12, the ink of the ink ribbon R is transferred onto the print medium M by the heat of the heating elements, the printing is performed on the print medium M. A positive rotation of the platen roller 12 by a platen driving motor (not illustrated) feeds the continuous body ML and the ink ribbon R to downstream.

The used ink ribbon R is rolled up to the outer a periphery of the ribbon roll up shaft 30 when the ribbon roll up shaft 30 rotates due to engagement of gears with the platen drive motor. When the head unit 11 is in the head-open position, just the ink ribbon R can be fed by rotating the ribbon roll up shaft 30.

The following describes a printer 1 of the ink ribbon transfer type by the thermal head 13, however it is not limited to this. For example, the print medium M may be thermal paper, and the printer may be one using a thermal coloring system that prints onto the print medium M by applying heat from the thermal head 13.

The upstream side position detection sensor 71 includes a transmission type photoelectric sensor and a reflection type photoelectric sensor. The continuous body ML is printed with an eye mark for position detection at a predetermined interval (pitch) in accordance with the print medium M. The reflection type photoelectric sensor detects a relative position of the print medium M with respect to the printing unit 15 by detecting the eye mark. The transmission type photoelectric sensor detects the relative position of the print medium M with respect to the printing unit 15 by detecting a clearance (gap) between a print medium M and a print medium M on the continuous body ML.

The downstream side position detection sensor 72 includes a transmission type photoelectric sensor or a reflection type photoelectric sensor, and detects the head position of the continuous body ML.

The upstream side position detection sensor 71 and the downstream side position detection sensor 72 are determined in relative positions with the position of the printing unit 15, more specifically, the position at which the thermal head 13 performs printing onto the print medium M and the position at which the platen roller 12 and the thermal head 13 are nipped the continuous body ML. The upstream side position detection sensor 71 and the downstream side position detection sensor 72 can detect the relative position of the print medium M with respect to the printing unit 15 by detecting the position of the print medium M. The eye mark for position detection printed on the continuous body ML at a predetermined intervals (pitches) on the continuous body ML accordance with the print medium M and the gaps between the print media M serve as a criterion for setting a position to start printing on the print medium M (printing starting position).

The controller 60 receives input of, via an input/output interface, printing command data from an external computer, detection signals from the upstream side position detection sensor 71 and the downstream side position detection sensor 72 and the like. The controller 60 controls energization of the heating element in the thermal head 13, energization of respective drive motors, energization of an antenna 151 of the communication unit 50, communication (reading, writing) with the IC chip C of the print medium M (RFID inlet 110), and the like.

When printing, the controller 60 executes the printing process in a state where the position of the print medium M to be printed is aligned with the printing starting position, as illustrated in FIG. 1. The printing starting position is set on the basis of the position of the eye mark on the continuous body ML.

Figure 2:
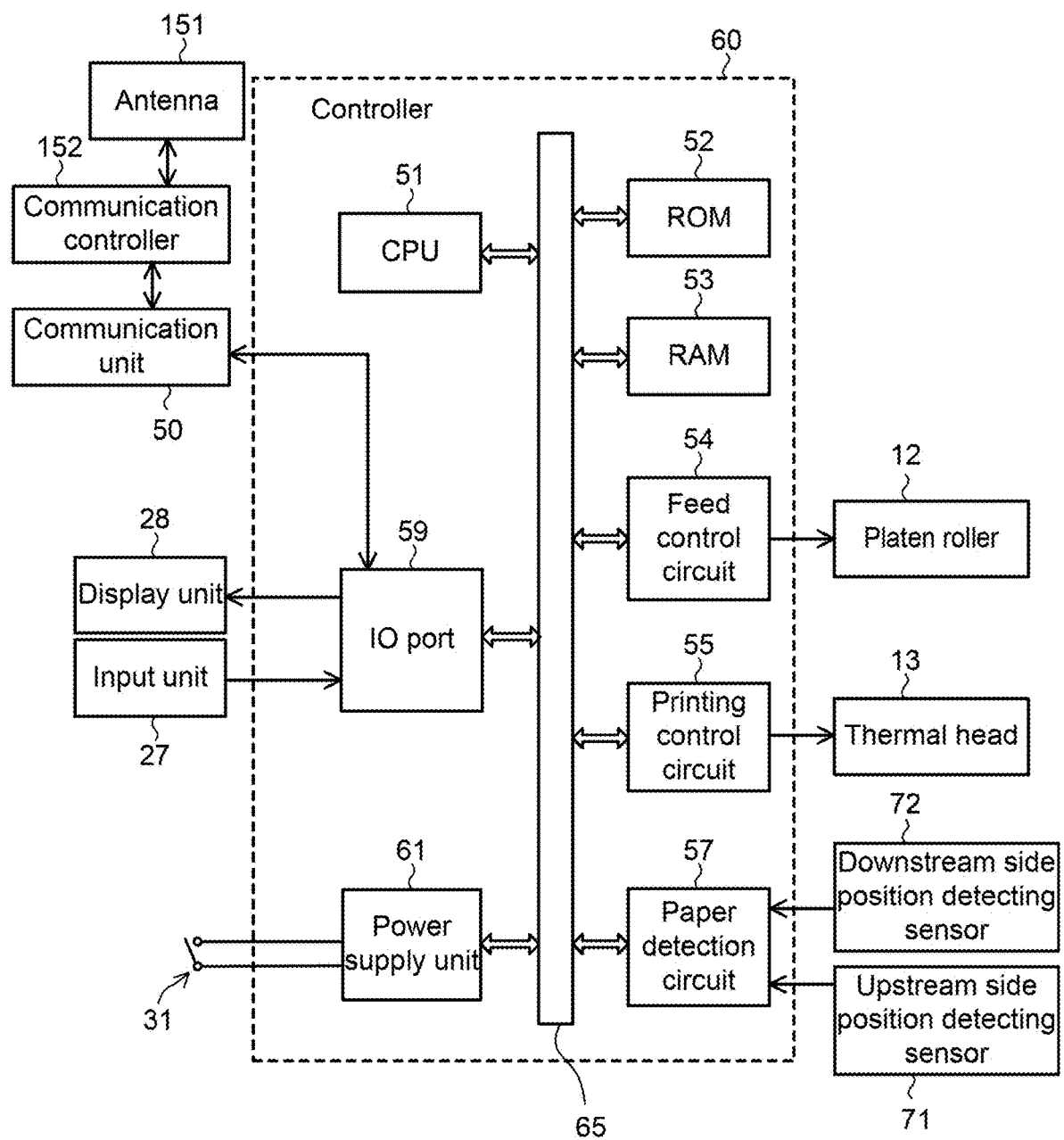
FIG. 2 is a control block diagram of a printer according to an embodiment of the present invention.

FIG. 2 is a configuration block diagram of the controller 60 of the present embodiment.

The controller 60 is, for example, includes a CPU (central processing unit) 51, a ROM (read only memory) 52, a RAM (random access memory) 53, a feed control circuit 54, a printing control circuit 55, a paper detection circuit 57, an IO port 59, and a power supply unit 61. These components are interconnected via a bus 65, and are configured capable of transmitting and receiving various data to each other.

The CPU 51 is a computer that integrally controls the entire controller 60 by executing a program stored on the ROM 52 while also causing each unit to execute the necessary processes and control. The CPU 51 achieves the functions of each unit described in FIG. 4 by executing the program stored on the ROM 52. The various programs executed by the CPU 51 may use for example those stored on a non-transitory recording medium such as a CD-ROM or a non-volatile memory.

The ROM 52 stores a program that is read out and executed by the CPU 51. The RAM 53 stores various information necessary for the processes executed by the CPU 51, printing data necessary for printing, printing format, registration information, and the like.

The feed control circuit 54 controls a drive motor that drives the platen roller 12 in accordance with an command signal from the CPU 51, and controls rotation/termination of the platen roller 12. This controls the feed of the continuous body ML on a paper feeding path.

The printing control circuit 55 generates a printing signal corresponding to printing data such as characters, figures and barcodes to be printed that are supplied from the CPU 51, and supplies the generated printing signal to the thermal head 13 to perform printing onto the print medium M.

The paper detection circuit 57 detects a detection portion such as the eye mark or a gap provided in the continuous body ML on the paper feeding path has, on the basis of information obtained by the upstream side position detection sensor 71 and the downstream side position detection sensor 72, and transmits this information to the CPU 51. The CPU 51 controls the feed of the continuous body ML and the ink ribbon R by the feed control circuit 54 on the basis of the information from the paper detection circuit 57, and controls a timing for the printing with the thermal head 13 to perform the printing to an appropriate position on the print medium M.

The IO port 59 is connected to the display unit 28 and the input unit 27, and outputs display data supplied from the CPU 51 to the display unit 28. Moreover, the IO port 59 transmits an operation signal corresponding to an operation by the user to the input unit 27 to the CPU 51. The IO port 59 transmits and receives information with the communication unit 50, and performs communication (reading, writing) with the IC chip C of the RFID inlet 110.

The display unit 28 is configured of a liquid crystal display for example. The input unit 27 is configured of a touch panel equipped in the display unit 28, a button, a DIP-SW or the like.

The power supply unit 61 monitors a pressing operation of the power switch, and turns the power of the printer 1 on/off by switching execution and termination of electric power supply to each unit on the basis of operation of the power switch.

The communication unit 50 includes, for example, the antenna 151 and a communication controller 152. The antenna 151 outputs a radio wave signal on the basis of control by the communication controller 152, to perform communication with the RFID inlet 110 of the print medium M. The communication controller 152 controls power feed to the antenna 151, on the basis of commands of the controller 60.

Figure 3:
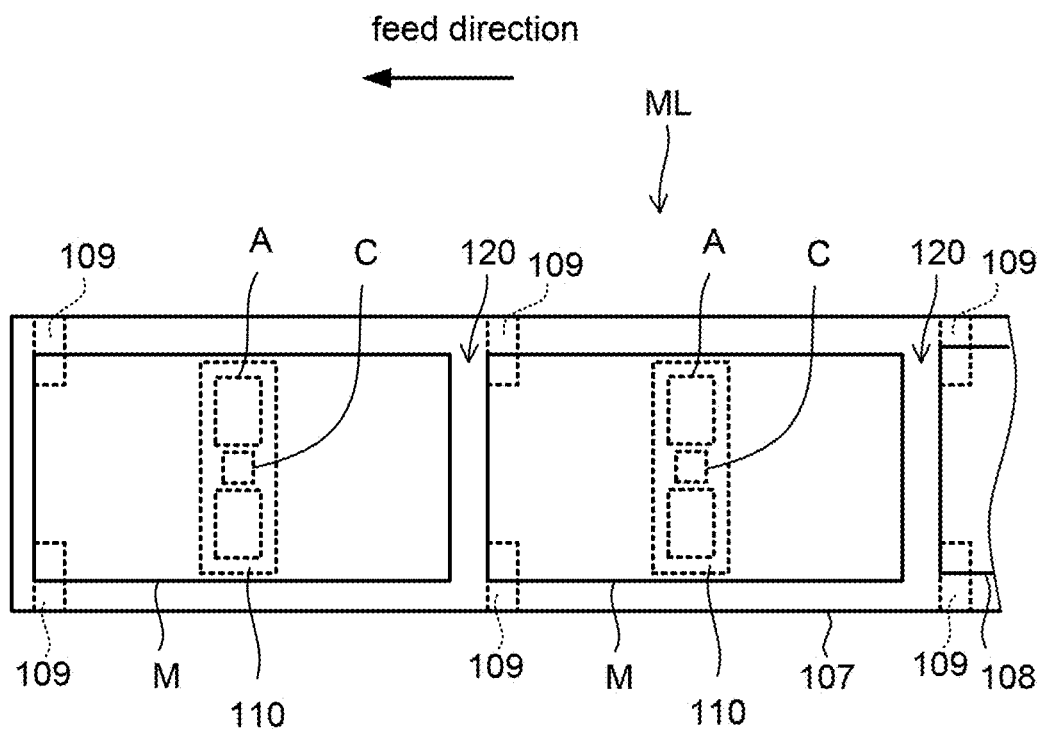
FIG. 3 is a plan view of a label.

Next describes the print medium M. FIG. 3 is a plan view describing the continuous body ML including the print medium M.

The continuous body ML is configured of, for example, a band-form backing paper 107, and plurality pieces of label strips (print medium M) temporarily attached on the backing paper 107.

On a back side of the backing paper 107, eye marks 109 for position detection is printed in advance at positions corresponding to tips on a downstream side in the fed direction of the print medium M. Gaps 120 are provided between adjacent print media M.

The eye marks 109 are printed in predetermined rectangular shapes in a dark color (for example, black color) compared to the backing paper 107. The upstream side position detection sensor 71 can set the printing starting position by detecting the positions of the eye marks 109 by using the color of the eye marks 109 being darker than the backing paper 107.

The gaps 120 have only the thickness of the backing paper 107 compared to locations where the print medium M is present, and thus has high transmissivity. The upstream side position detection sensor 71 and the downstream side position detection sensor 72 can set the printing starting position by detecting the positions of the gaps 120 by using the high transmissivity of the gaps 120.

The RFID inlet 110 is, for example, disposed around a center portion of the print medium M in the fed direction.

The RFID inlet 110 is configured, for example, including the IC chip C and the antenna A. The IC chip C of the RFID inlet 110 commences operation by the antenna A receiving a signal outputted from the antenna 151 of the communication unit 50, and outputs a response to this signal via the antenna A.

Next describes operations of the printer 1 configured as described above. The printer 1 of the present embodiment prints onto the print medium M, as well as reading data recorded on the RFID inlet 110 of the print medium M and writing on the RFID inlet 110. The printer 1 is configured, for example, so that the antenna 151 of the communication unit 50 is located corresponding to the RFID inlet 110 when the print medium M is at the printing starting position. Therefore, the printing process can be performed in a state where the print medium M is at the printing starting position and after performing communication with the RFID inlet 110.

The RFID inlet 110 is adjusted to have an appropriate signal strength, for example at a time of shipping from the manufacturing factory. Conventionally, the printer 1 determines whether the writing was successful or not by verifying the written data, after writing onto the RFID inlet 110.

However, the RFID inlet 110 attached on the print medium M varies in signal strength between the printer 1 and the RFID inlet 110 due to the fixed state on the print medium M, aging, and the like. Moreover, the positioning of the RFID inlet 110 with respect to the antenna 151 of the communication unit 50 also varies depending on the manufacturing factory or manufacturing maker of the print medium M and the continuous body ML.

Therefore, cases occur where the writing onto the RFID inlet 110 cannot be performed normally, or where although the writing was performed normally, the reading cannot be performed normally later. The case where the writing in is not performed normally can be found in the verification process described above; when the writing is performed normally however, conventionally no assumption was made in advance that a case may occur that the reading cannot be performed normally.

Accordingly, the printer 1 of the present embodiment is configured as follows, so that the printer 1 can determine whether the RFID inlet 110 is normal or not on the basis of radio wave strengths of each RFID inlet 110 (RSSI: Received Signal Strength Indicator) provided on the print medium M.

Figure 4:
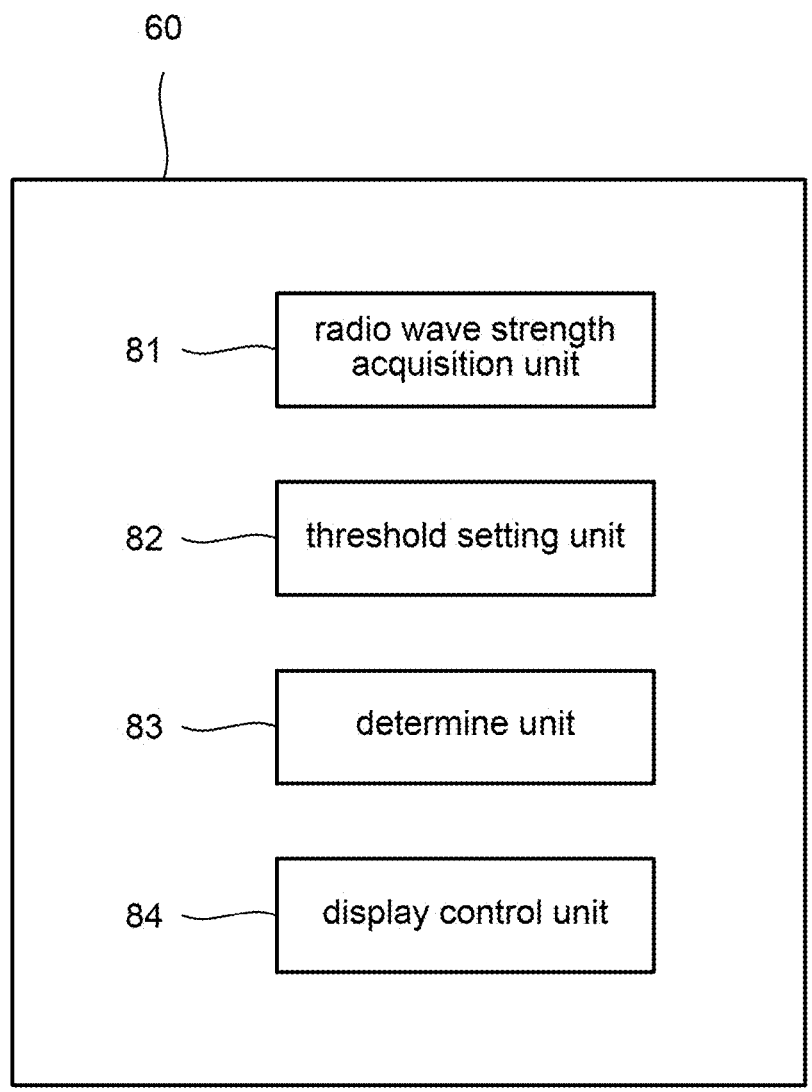
FIG. 4 is a configuration block diagram of a controller.

FIG. 4 is a functional block diagram of the controller 60 of the present embodiment. The functional block diagram illustrated in FIG. 4 illustrates an overview of a function to determine whether the RFID inlet 110 of the present embodiment is normal or not as a virtual unit, and does not necessarily mean to be a physical configuration. Actual operations of each unit will be described in detail in FIG. 6 on.

The controller 60 includes, for example, a radio wave strength obtaining unit 81, a threshold setting unit 82, a determine unit 83, and a display control unit 84.

The radio wave strength obtaining unit 81 obtains an RSSI value of the RFID inlet 110 provided in the print medium M, in a state where the continuous body ML is mounted on the printer 1. The process of the radio wave strength obtaining unit 81 is, for example, executed by command from the user.

The threshold setting unit 82 analyzes the RSSI value obtained by the radio wave strength obtaining unit 81, and sets a threshold serving as an indicator for determining whether the RFID inlet 110 is normal or not. The process of the threshold setting unit 82 is, for example, executed after acquiring the RSSI value of the RFID inlet 110.

The determine unit 83 determines whether the RFID inlet 110 is normal or not, by using a threshold set by the threshold setting unit 82. The process of the determine unit 83 is, for example, executed when printing onto the print medium M is carried out.

Figure 5:
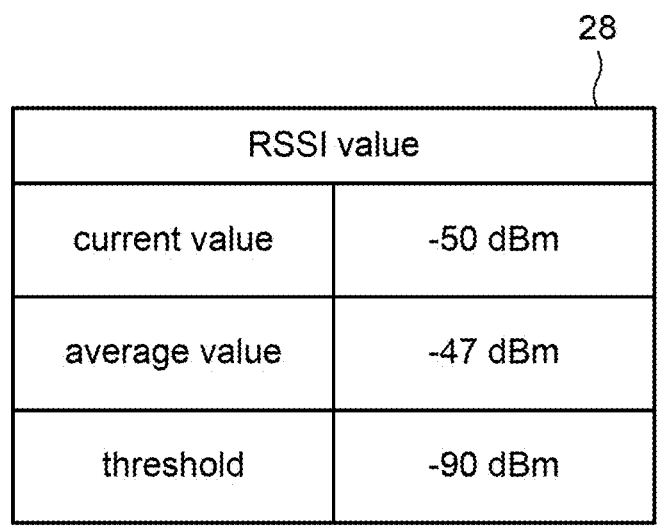
FIG. 5 is an explanatory drawing of a representation of radio wave strength on a display unit.

The display control unit 84 displays the RSSI value obtained from the RFID inlet 110 by the radio wave strength obtaining unit 81 on the display unit 28. FIG. 5 is an explanatory diagram illustrating one example of the RSSI value of the RFID inlet 110 displayed on the display unit 28 by the display control unit 84.

The display control unit 84 causes display of the RSSI value obtained from the RFID inlet 110 on the display unit 28 in a displaying form as illustrated in FIG. 5. In the example of FIG. 5, in a case where the threshold setting unit 82 has already calculated an average value or a threshold from the RSSI values already obtained, the display control unit 84 may display those information concurrently with a current value obtained by the radio wave strength obtaining unit 81. This allows for a user to easily recognize how different to what degree the current value is, compared to the average value or the threshold.

The radio wave strength obtaining unit 81, the threshold setting unit 82, the determine unit 83, and the display control unit 84 may be included in one printer 1, or the units may be included in different printers 1 respectively, for example.

For example, the threshold may be set by the radio wave strength obtaining unit 81 and the threshold setting unit 82, by using the continuous body ML with the printer 1. In this case, the set threshold is stored on the RAM 53 of another printer 1 thereafter and another continuous body ML of the same specification as this continuous body ML is mounted on another printer 1, and then the determine unit 83 may determine whether the RFID inlet 110 of that continuous body ML is normal or not.

Figure 6:
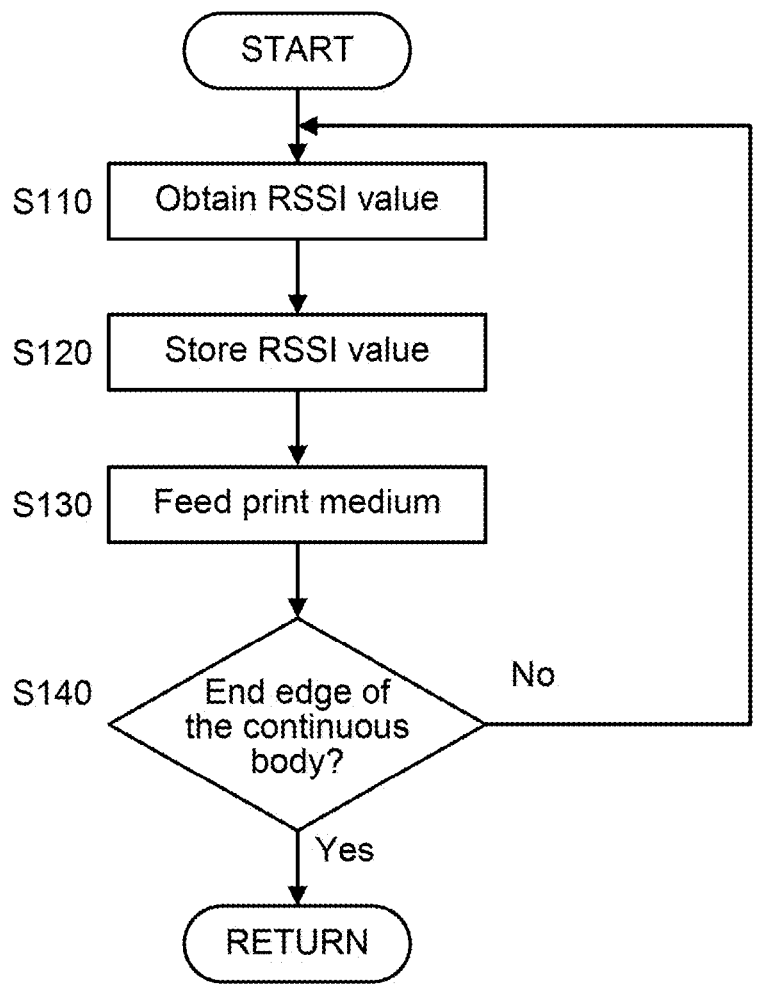
FIG. 6 is a flowchart of a radio wave strength acquisition process.

FIG. 6 is a flowchart of a process executed by the radio wave strength obtaining unit 81. The controller 60 displays a menu on the display unit 28 in a state where the continuous body ML is mounted on the printer 1. The controller 60 executes the process illustrated in the flowchart of FIG. 6 in a case of detecting an input of a command to execute the radio wave strength acquisition process from the menu displayed on the display unit 28, via the input unit 27.

A proposition for the process of the radio wave strength obtaining unit 81 is a state where a tip part of the continuous body ML is inserted to the printing starting position (position nipped by the platen roller 12 and the thermal head 13 of the printing unit 15).

The radio wave strength obtaining unit 81 transmits a signal via the communication unit 50 to the RFID inlet 110 of the print medium M at that position. The RFID inlet 110 outputs a signal in response to the sent signal. When a response from the RFID inlet 110 is received, the radio wave strength obtaining unit 81 acquires a radio wave strength (RSSI value) of the signal received via the communication unit 50 (step S110).

Next, the radio wave strength obtaining unit 81 associates the obtained RSSI value with a series of numbers from a lead position of the print medium M on the continuous body ML, or with a number unique to the RFID inlet 110, and stores this on the RAM 53 (step S120).

Next, the controller 60 causes the platen roller 12 to operate, and feeds a next print medium M (print medium M on an upstream side in the fed direction) to the printing starting position (step S130).

When the print medium M is fed, determination is made whether the next print medium M is present or not, that is to say, whether it is the end edge of the continuous body ML (step S140).

In a case where the next print medium M is present, the radio wave strength obtaining unit 81 returns back to step S110, and transmits a signal via the communication unit 50 for the next print medium M and acquires a signal strength (RSSI value) of the signal received from the RFID inlet 110 in response to the signal. The obtained RSSI value is stored on the RAM 53 upon association with a series of numbers from the tip position of the print medium M on the continuous body ML, or with a number unique to the RFID inlet 110.

The display control unit 84 may cause display of, on the display unit 28, the RSSI value obtained from the RFID inlet 110 in step S110 (see FIG. 5). At this time, in a case where an average value and a threshold described later are already calculated, these may be displayed.

In step S140, in a case where the continuous body ML reaches it transmit and no next print medium M exists, the process on the basis of the present flowchart ends. In a case where the printer 1 has a rewinding function of the continuous body ML, the controller 60 may cause the platen roller 12 to operate, and rewind the continuous body ML by feeding the print medium M in an opposite direction.

In the process illustrated in FIG. 6, the RSSI value is obtained for all the print media M temporarily attached on the continuous body ML, however it is not limited to this. For example, RSSI values for several to several dozen print media M may be obtained.

Figure 7:
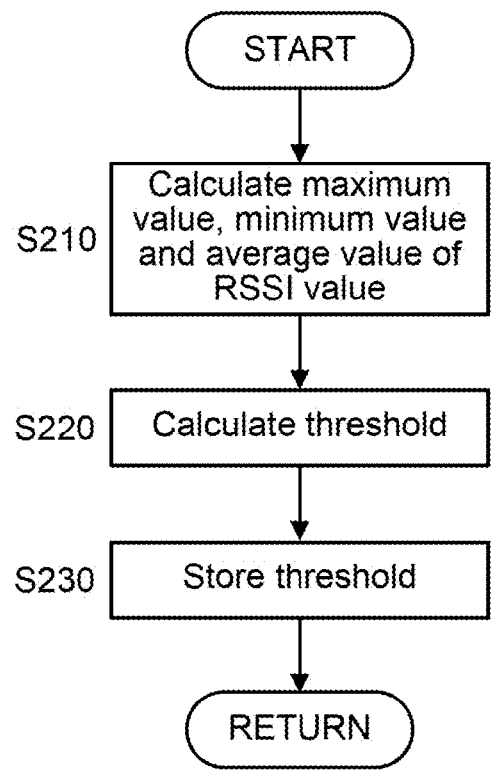
FIG. 7 is a flowchart of a threshold calculation process.

FIG. 7 is a flowchart of a process executed by the threshold setting unit 82. The threshold setting unit 82 executes the flowchart illustrated in FIG. 7 after RSSI values are stored for a plurality of the print media M by the process of the radio wave strength obtaining unit 81.

The process of the threshold setting unit 82 illustrated in FIG. 7 may be executed immediately after the process of the radio wave strength obtaining unit 81, or may be executed in a case of detecting an input of a command from the user from the menu displayed on the display unit 28 via the input unit 27.

First, the threshold setting unit 82 extracts, from all the obtained RSSI values, a maximum value and a minimum value, and also calculates an average value (step S210).

Next, the threshold setting unit 82 calculates, from the minimum value and the average value, a threshold that serves as an indicator to determine whether the RFID inlet 110 is normal or not (step S220). Thereafter, the calculated threshold is stored on the RAM 53 (step S230).

Hereinafter, the threshold is described. The RFID inlet 110 is defined in advance of a range of radio wave strengths for appropriately performing reading and writing. In a case where the RSSI value of the RFID inlet 110 is out of this range (particularly in a case of being below), the reading and writing cannot be performed normally, and hence the writing will fail.

On the other hand, in a case where the value is within the defined range, a RFID inlet 110 with a radio wave strength close to the defined lower limit will complete the writing normally. However, such RFID inlet 110 may encounter problems such as not been able to read the data at the time of reading, or not being able to retain the data for a long period of time.

Accordingly, by setting the radio wave strength having a margin against the lower limit of the defined range as the threshold, it is possible to determine the RFID inlet 110 that may possibly encounter such problems.

The threshold is determined by, for example, taking a normal distribution from the maximum value, minimum value, and average value, and not accepting a portion equivalent to the low several percent. Alternatively, a value within several percent from the defined range of the radio wave strength of the RFID inlet 110 may be determined as the threshold.

The threshold may be made high or low according to the application. For example, in a case where the RFID inlet 110 is for an application short in use period, there is no need to retain the data for a long period of time; hence, the threshold may be set relatively with ease (close to the lower limit of the defined value).

On the other hand, in critical applications that cannot accept data loss or in a case where data needs to be retained in the RFID inlet 110 for a long period of time, the threshold may be set relatively strict (away from the lower limit of the defined value).

Figure 8:
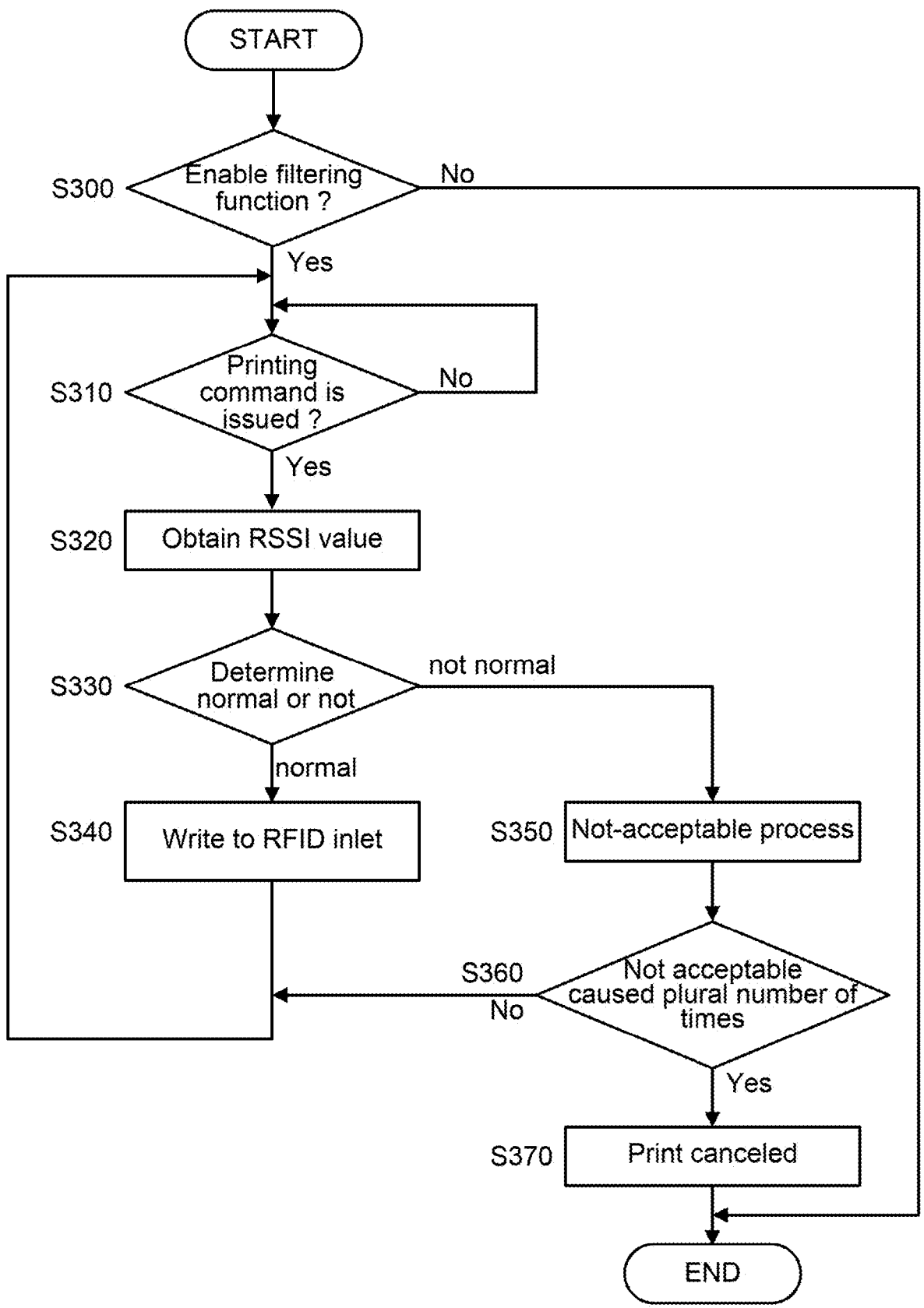
FIG. 8 is a flowchart of a determine process.

FIG. 8 is a flowchart of a process executed by the determine unit 83.

First, the determine unit 83 determines whether or not to execute a process of determine whether the RFID inlet 110 is normal or not on the basis of the set threshold (also called "filtering function") (S300). The flowchart illustrated in FIG. 8 may be executed at a predetermined cycle (for example, 10 ms).

The determine unit 83, for example, acquires a command by the user from the menu displayed on the display unit 28 of whether to enable or disable the filtering function. In a case where the user command is to enable, the process moves on to step S310 and the process continues. In a case where the user command is to disable, no process in the present flowchart is executed. In other words, the printing process based on a printing command and the writing process onto the RFID inlet 110 are executed without performing the determination of whether the RFID inlet 110 is normal on the basis of the threshold. As such, in a case where the filtering function is disabled by the user, the speed of the printing process improves by the degree that no determination is made of whether the RFID inlet 110 is normal.

Next, the determine unit 83 determines, on the basis of the threshold set by the threshold setting unit 82, whether the RFID inlet 110 is normal or not.

As described above, the process of the determine unit 83 may be executed at a printer different from the printer 1 on which the processes of the radio wave strength obtaining unit 81 and the threshold setting unit 82 are executed. For example, the threshold is set in advance by using a continuous body ML at a factory or a service center. Thereafter, the following process may be executed in a state where the set threshold is stored on the RAM 53 of the printer 1 installed at a used location by wireless communication, memory card or the like and where the continuous body ML of the same specification is mounted thereon.

The determine unit 83, for example, determines whether or not a printing command is issued, and goes on standby (step S310).

In the case where the determine unit 83 determines that the printing command is issued, the process moves on to step S320 and executes the printing process on the basis of the printing command. Here, in a case where the printing command includes a command to write onto the RFID inlet 110, communication with the RFID inlet 110 is carried out via the communication unit 50. In carrying out the communication, the determine unit 83 acquires the RSSI value of the RFID inlet 110 by the radio wave strength obtaining unit 81 via the communication unit 50 (step S320).

Next, the determine unit 83 compares the RSSI value obtained by the radio wave strength obtaining unit 81 and the threshold determined by the threshold setting unit 82 in the process of FIG. 7 described above, and determines whether it is normal or not (step S330).

In a case where the obtained RSSI value is equal to or more than the threshold as a result of comparison, the determine unit 83 determines that that RFID inlet 110 is normal. In a case where the determine unit 83 determines the RFID inlet 110 as normal, the process moves on to step S340 and the determine unit 83 executes the writing process onto that RFID inlet 110 via the communication unit 50.

As a result of comparison, in a case where the obtained RSSI value does not reach the threshold, the determine unit 83 determines that that RFID inlet 110 is not normal, namely, that there is a high possibility that it may encounter a problem (or has already encountered a problem), and the process moves on to step S350.

In step S350, the determine unit 83 performs a not-acceptable process to that RFID inlet 110. More specifically, the determine unit 83 prohibits the use of the RFID inlet 110 whose RSSI value does not reach the threshold. One example includes canceling the printing corresponding to the printing command issuance in step S310, and prohibiting the use of that print medium M. At this time, the determine unit 83 may display on the display unit 28 a representation that the use of that print medium M is prohibited, by the display control unit 84. Moreover, the determine unit 83 may perform printing control to a printing region of the print medium M that the use thereof is prohibited since there is a problem with the RFID inlet 110.

Next, the process moves on to step S360, and the determine unit 83 determines whether the RFID inlet 110 is determined as not normal or not (deemed not acceptable) successively for a plural number of times (for example two or more times). In a case where it is not determined not normal successively for a plural number of times, the process returns back to step S310 and repeats the process. In the case where there is an RFID inlet 110 whose use is prohibited due to the not acceptable process described above, the determine unit 83 may control to convey the continuous body ML and write in details to be written onto the RFID inlet 110 whose use is prohibited, to the RFID inlet 110 of the next print medium M.

In the case where the determine unit 83 determines that the RFID inlet 110 is not normal successively for a plural number of times, the entire continuous body ML including the print medium M of the RFID inlet 110 is determined as not normal, and the printing to all print media M of that continuous body ML is canceled (step S370). At this time, the determine unit 83 may display on the display unit 28 a representation that the continuous body ML is prohibited in use, by the display control unit 84. Moreover, the determine unit 83 may perform printing on the printing region of the print medium M at the printing starting position that the continuous body ML is prohibited in use since there is a problem with the RFID inlet 110. After the process of step S370, the processes in the present flowchart ends.

By the processes as like the above, the determine unit 83 can determine whether the RFID inlet 110 of the print medium M is normal or not.

In the not-acceptable process of step S350, the printing is canceled due to the print medium M being prohibited in use in the case where the RSSI value does not reach the threshold, however it is not limited to this; this may be controlled to print on the print medium M corresponding to the printing command while also writing on the RFID inlet 110 that determination. Moreover, in the case where the RSSI value does not reach the threshold, the printing corresponding to the printing command may be performed on the print medium M, while printing that determination as characters or symbols.

As described above, by placing a marking by a print or the like on the print medium M having the RFID inlet 110 whose RSSI value does not reach the threshold, it makes it easy for the user to determine later that the radio wave strength of that RFID inlet 110 is relatively low. This allows for executing processes such as increasing the reading radio wave strength with respect to the RFID inlet 110 whose RSSI value does not reach the threshold, or setting an expiration date of the RFID inlet 110 short.

Furthermore, in the radio wave strength acquisition process, the RSSI values of the RFID inlet 110 of the print media M on the continuous body ML are recorded together with a series of numbers from a lead position of the print medium M on the continuous body ML (RSSI value log function). Whether the RSSI value is relatively low may be determined in advance, by reading out from the recorded region the RSSI value of the RFID inlet 110 of the print medium M at the current printing starting position, when the printing command is issued.

Even in the case of a (normal) RFID inlet 110 whose RSSI value is not not-acceptable by exceeding the threshold, the determine unit 83 can control to relatively increase the radio wave strength at the time of writing on that RFID inlet 110, for writing thereon. As such, by writing on the RFID inlet 110 upon increasing the radio wave strength with respect to the RFID inlet 110 that may encounter an error at the time of reading later, it is possible to reduce the possibility that an error would occur at the time of reading later.

As described above, according to the present embodiment, the printer 1 prints each print medium M having an RFID (RFID inlet 110), and is configured including a radio wave strength obtaining unit 81 that acquires radio wave strength (RSSI value) from the RFID inlet 110 provided on the print medium M, and a determine unit 83 that determines whether the RFID inlet 110 is normal or not on the basis of the radio wave strength obtained by the radio wave strength obtaining unit 81 and a threshold.

According to this, it is possible to determine whether the RFID inlet 110 is normal or not in advance, on the basis of the radio wave strength of the RFID inlet 110. Therefore, it is possible to prevent occurrence beforehand of a case where although the writing onto the RFID inlet 110 was carried out normally, the reading is deemed as not normal.

The printer 1 further includes a threshold setting unit 82 that sets a threshold on the basis of an average value or lower limit value of the radio wave strength for each of a plurality of the RFID inlets 110 obtained by the radio wave strength obtaining unit 81; this allows for setting the threshold on the basis of the radio wave strength and determine whether the RFID inlet 110 is normal or not in advance, on the basis of this threshold. Therefore, it is possible to prevent occurrence beforehand of a case where although the writing onto the RFID inlet 110 was carried out normally, the reading is deemed as not normal.

The printer 1 further includes a display control unit (controller 60) that causes display of the radio wave strength obtained by the radio wave strength obtaining unit 81 on the display unit 28 for each RFID inlet 110; this allows for easy visual recognition of the radio wave strength of the RFID inlet 110, thus improving user convenience.

The radio wave strength obtaining unit 81 acquires the radio wave strength of the RFID inlet 110 for each of the plurality of the print medium M temporarily attached on the continuous body ML.

According to this, the threshold can be set on the basis of the radio wave strength obtained from the RFID inlet 110 of a plurality of the print media M; this thus allows for more accurately determine whether the RFID inlet 110 is normal or not.

The determine unit 83, when printing on the print medium M, compares the set threshold and the radio wave strength from the RFID inlet 110 of that print medium M obtained at the time of printing, and in a case where the RFID inlet 110 is determined as not normal as a result of comparison, the printing is canceled, for example.

According to this, it is possible to exclude in advance an RFID inlet 110 that may encounter an error at the time of reading later even though the writing was performed normally; this allows for determine in advance a print medium M whose RFID inlet 110 is not normal.

The determine unit 83, when printing on the print medium M, compares the set threshold and the radio wave strength from the RFID inlet 110 of that print medium M obtained at the time of printing, and in a case where the RFID inlet 110 is determined as not normal as a result of comparison, the determine unit 83 can also print on the print medium M having that RFID inlet 110 that point, without canceling the printing.

According to this, it is possible to visually determine, in the action of confirming the printed details, the print medium M having the RFID inlet 110 that may encounter an error at the time of reading later even if the writing was performed normally.

The determine unit 83, when printing on the print medium M, compares the set threshold and the radio wave strength from the RFID inlet 110 of that print medium M obtained at the time of printing, and in a case where the RFID inlet 110 is determined as not normal as a result of comparison, the determine unit 83 can write on that RFID inlet 110 that issue, without canceling the printing.

According to this, a record is made on the RFID inlet 110 that may encounter an error at the time of reading later even if the writing was performed normally; hence, it is possible to determine, not only at the time of printing but also at the time of reading, whether the RFID inlet 110 is normal or not.

The radio wave strength obtaining unit 81 records the radio wave strength of the RFID inlet 110 of each of the plurality of the print medium M temporarily attached to the continuous body ML and the positions of the RFID inlet 110 on the continuous body ML, and when printing on the print medium M, can acquire the radio wave strength recorded corresponding to the position of the RFID inlet 110 at the printing starting position and write on the RFID inlet 110 with the writing radio wave strength corresponding to the obtained radio wave strength.

Accordingly, by writing on the RFID inlet 110 that may encounter an error at the time of reading with an increased radio wave strength in advance, it is possible to reduce the possibility that an error occurs at the time of reading later.

While some embodiments of the present invention have been described, the above-described embodiments illustrate some examples to which the present invention is applicable and are not intended to limit the technical scope of the present invention to the specific configurations of the above-described embodiments.

The present application claims priority to Japanese Patent Application No. 2019-066732 filed on Mar. 29, 2019 to Japan Patent Office, the entire content of which is incorporated herein by reference.

The invention claimed is:

1. A printer comprising:
a controller configured to:
acquire a plurality of radio wave strengths of a plurality of RFID signals, each RFID signal being from an RFID included in each of a plurality of printing media,
set a threshold based on the acquired plurality of the radio wave strengths, and
determine whether or not each RFID is normal based its respective radio wave strength and the set threshold.

2. The printer according to claim 1, wherein:
the controller is configured to set the threshold based on an average value and/or a minimum value of the acquired plurality of radio wave strengths.

3. The printer according to claim 1, wherein:
the controller is further configured to cause display of the acquired plurality of radio wave strengths on a display unit.

4. The printer according to claim 1, wherein:
the controller is configured to acquire the radio wave strengths while the printing media are attached to a continuous body that is mounted to the printer.

5. The printer according to claim 4, further comprising:
a printing unit configured to print on the printing media; and
a communication unit configured to read data from the RFID and to write data onto the RFID, wherein:
the controller is configured to, for each printing medium,
acquire a position of the RFID of the printing medium that is attached to the continuous body, and
acquire, at a time of printing on the printing medium, a recorded radio wave strength of the RFID of the printing medium at a printing starting position and write onto the RFID at the printing starting position a writing radio wave strength corresponding to the acquired radio wave strength.

6. The printer according to claim 1, further comprising:
a printing unit configured to print on the printing media, wherein:
the printing unit is configured to cancel printing on any one of the printing media that has an RFID that is determined by the controller to be not normal.

7. The printer according to claim 1, further comprising:
a printing unit configured to print on the printing media, wherein:
the printing unit is configured to, on any one of the printing media that has an RFID that is determined by the controller to be not normal, print an indication that the RFID is not normal.

8. The printer according to claim 1, further comprising:
a communication unit configured to read data from the RFID and to write data onto the RFID, wherein:
the communication unit is configured to, for any RFID that is determined by the controller to be not normal, write an indication that the RFID is not normal onto the RFID.

9. A method of controlling a printer, the method comprising:
acquiring a plurality of radio wave strengths of a plurality of RFID signals, each RFID signal being from an RFID included in each of a plurality of printing media,
setting a threshold based on the acquired plurality of the radio wave strengths, and
determining whether or not each RFID is normal based its respective radio wave strength and the set threshold.

10. A non-transitory computer-readable medium storing a program executable by a computer of a printer, the program causing the computer to:
acquire a plurality of radio wave strengths of a plurality of RFID signals, each RFID signal being from an RFID included in each of a plurality of printing media,
set a threshold based on the acquired plurality of the radio wave strengths, and
determine whether or not each RFID is normal based its respective radio wave strength and the set threshold.

* * * * *